Jan. 14, 1941.　　　A. B. PETERSON　　　2,228,887
STACKER AND UNLOADER
Filed April 28, 1938　　　3 Sheets-Sheet 1
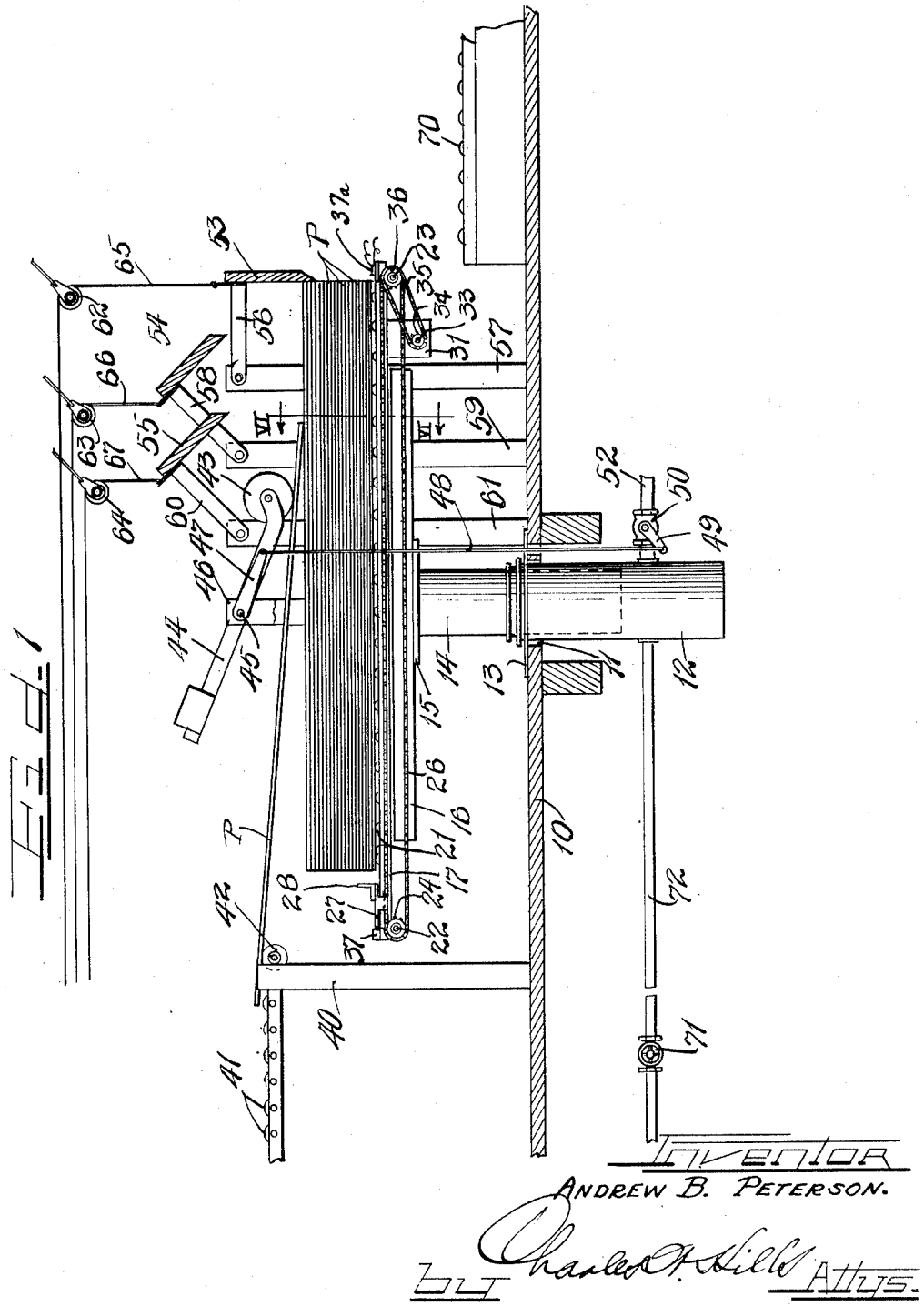

Jan. 14, 1941.     A. B. PETERSON     2,228,887
STACKER AND UNLOADER
Filed April 28, 1938     3 Sheets-Sheet 2
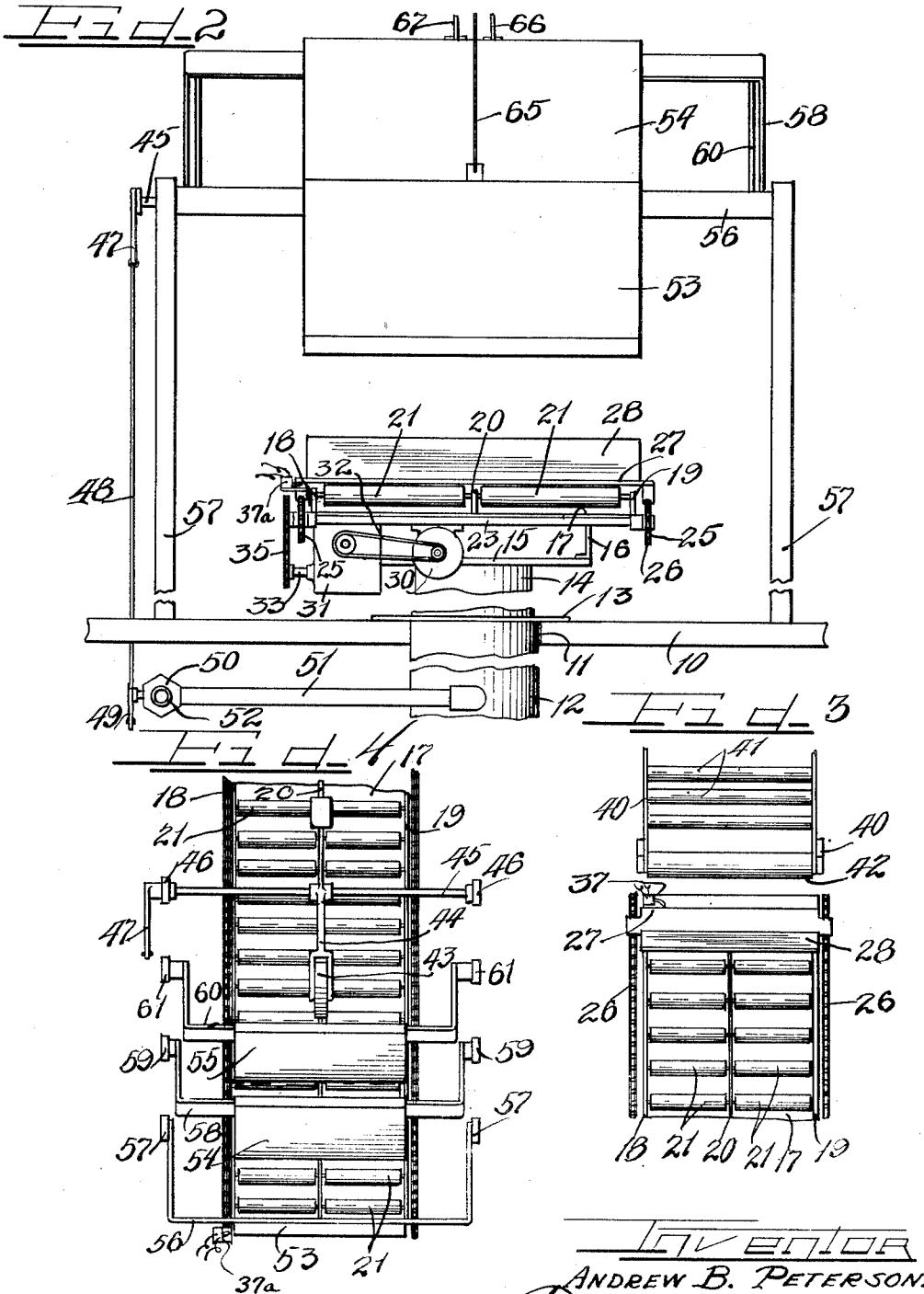

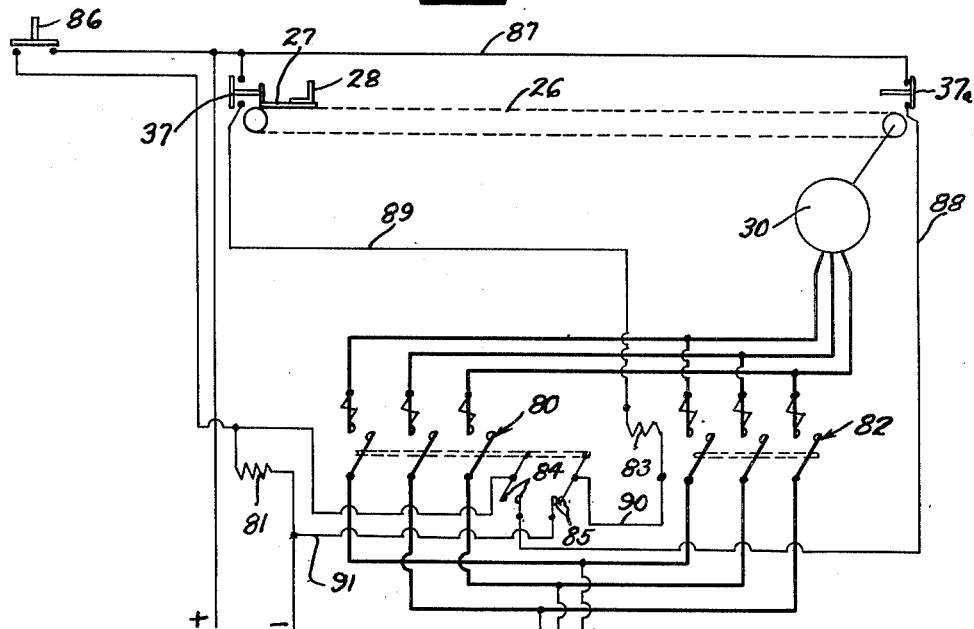
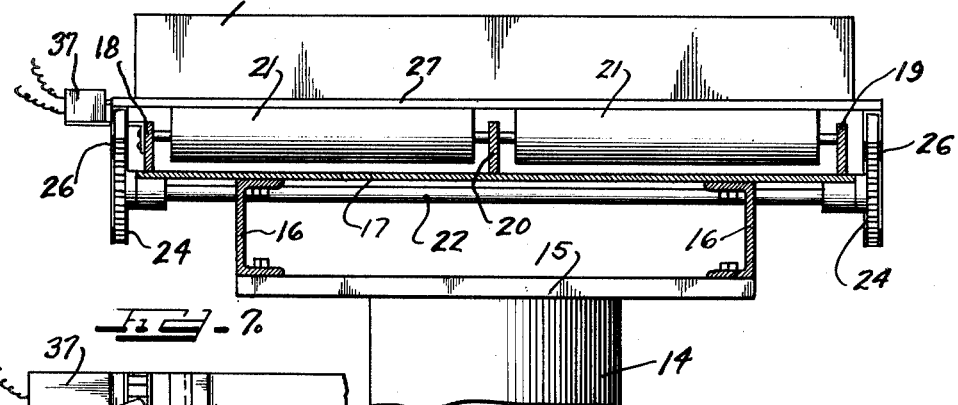
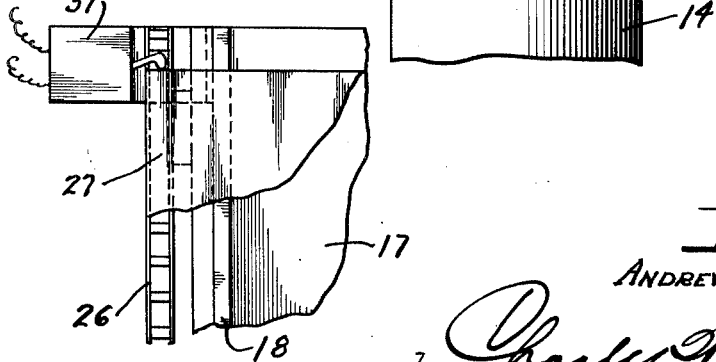

Patented Jan. 14, 1941

2,228,887

UNITED STATES PATENT OFFICE 2,228,887

STACKER AND UNLOADER

Andrew B. Peterson, Hoquiam, Wash., assignor to Harbor Plywood Corporation, Hoquiam, Wash., a corporation of Delaware Application April 28, 1938, Serial No. 204,759

3 Claims. (Cl. 214—6)

This invention relates to a device for stacking sheet material and for discharging a stack of such material. More specifically the invention relates to a device for stacking plywood panels and for unloading a completed stack of the panels.

While the invention will be hereinafter specifically described for use in the stacking and unloading of plywood panels it should be understood that the machines of this invention are not limited to such use.

In the manufacture of plywood, the plywood panels are trimmed or cut to standard sizes. It is customary to first cut the ends of the panels and to then rip cut the sides of the panels to a standard width. The discharge of the cut panels from the rip saw has heretofore required the services of one or more operators to stack the panels in piles and to deposit the stacks on a conveyor for removal to an inspection and sanding department.

This invention now obviates the necessity for operators to stack plywood panels discharged from the rip saw cutter and provides for the automatic stacking of the panels as well as for the automatic unloading of a stack to the conveyor.

The device of this invention comprises a hydraulic elevator that is automatically lowered, a step at a time, as each plywood panel is deposited on the elevator. The device includes bumpers for evening up the ends of the stack. The elevator itself comprises a roller conveyor platform receiving the stack of panels thereon and an automatic pusher device for unloading the stack onto the conveyor when the stack has reached a desired height.

It is then an object of this invention to provide a stacking and unloading device for sheet material such as plywood panels, wall boards, lumber and the like.

It is another object of this invention to provide an accumulator that is automatically lowered a step at a time by the deposit of sheet or board material thereon.

Another object of this invention is to provide a stacker and unloader device at the discharge end of a plywood panel cutter in a plywood mill for eliminating manual stacking and unloading of the plywood panels discharged from the cutter.

A further object of the invention is to provide a device at the discharge end of a rip saw cutter that is operated entirely by the saw operator from the inlet end of the cutter machine.

Other and further objects of the invention will become apparent to those skilled in the art from the following detailed description of the annexed sheets of drawings which disclose a preferred embodiment of the invention.

On the drawings:

Figure 1 is a side elevational view of a stacker and unloader device according to this invention mounted between the discharge end of a rip saw cutter and the receiving end of a conveyor system.

Figure 2 is a broken end elevational view of the stacker and unloader shown in Figure 1.

Figure 3 is a fragmentary top plan view of the discharge end of a rip saw cutter and the receiving end of the stacker and unloader device according to this invention.

Figure 4 is a fragmentary top plan view of the stacker and unloader device.

Figure 5 is a schematic wiring diagram illustrating the electrical connections between the various parts of control equipment for the unloader portion of the apparatus.

Figure 6 is an enlarged vertical cross-sectional view taken along the line VI—VI of Figure 1, with parts shown in elevation and with the load on the platform omitted.

Figure 7 is a fragmentary top plan view of a corner of the platform of the apparatus.

As shown on the drawings:

As best shown in Figures 1 and 2, the reference numeral 10 designates generally a floor having a hole 11 therethrough for receiving therein the cylinder 12 of a hydraulic jack. A plate 13 surrounds the top end of the cylinder 12 and suspends the cylinder from the floor 10. A hydraulic ram 14 is slidable into and out of the cylinder 12.

As shown in Figures 1, 2 and 6, a plate 15 is secured to the top end of the ram 14. The plate 15 has channel beams 16 bolted to the side edges thereof. These beams 16 extend along the sides of the plate 15 and beyond the ends thereof to support a platform 17 bolted to the top flanges of the channel beams 16 as best shown in Figure 6.

As best shown in Figures 2, 3, 4 and 6, the platform 17 carries vertical plates or rails 18 and 19 at the sides thereof and a third plate or rail 20 in the middle thereof. The plates or rails 18 and 20 and the plates or rails 19 and 20 have conveyor rollers 21 extending therebetween and rotatably mounted therein.

The rollers 21 are positioned at spaced intervals transversely across the width of the platform 17 and along the full length of the platform.

Shafts 22 and 23 are rotatably mounted at the ends of the platform 17 slightly below the top face of the platform. The shafts 22 and 23 extend transversely beneath the platform and have sprocket gears 24 and 25 respectively secured on both ends thereof. Chains 26 are trained between the gears 24 and 25 on each side of the platform.

The top runs of the chains 26 support the ends of a cross bar 27 extending transversely across the platform 17 and mounted high enough to clear the rollers 21. The cross bar 27 has a push bar 28 secured at the front edge thereof for a purpose to be hereinafter more fully described.

As best shown in Figure 2, an electric motor 30 is supported under the platform 17 at the discharge end of the same. A gear box 31 is also suspended under the platform 17 adjacent the motor 30. The gear box is driven by the motor 30 through a belt or chain connection 32.

The driving shaft 33 of the gear box 31 extends out of the gear box at the side of the platform. A sprocket gear 34 (Figure 1) is secured on the shaft 33 and drives a chain 35 for driving a gear 36 on the shaft 23. The electric motor 30 thus drives the chains 26 on the sides of the platform and the chains 26 move the member 27 and push bar 28 longitudinally over the rollers 21. A limit switch 37 (Figures 1, 3 and 7) is mounted at the work receiving end of the platform such as on a bracket secured to the plate or rail 18. The switch 37 stops the motor 30 when the cross bar 27 is backed against the operating arm of the switch. A second limit switch 37a (Figures 1 and 4) is provided at the work discharge end of the platform to reverse the direction of travel of the chains when the push bar 28 reaches the discharge end. The electrical circuit embodying the limit switches 37 and 37a will be hereinafter more fully described.

In Figures 1 and 3, the reference numerals 40 designate a frame structure for a plurality of conveyor rollers 41 at the discharge end of a plywood panel rip saw cutter (not shown). An end roller 42 is provided at the end of the framework 40 and is driven to move plywood panels "P" onto the conveyor rollers 21 of the stacking device.

As best shown in Figures 1 and 4, these panels "P" are pushed by the roller 42 under a hydraulic valve control assembly comprising a roll 43 mounted on an arm 44 carried on a shaft 45 that is rotatably supported between a pair of standards such as 46 mounted in spaced relation from the sides of the stacking device.

As shown in Figures 1, 2 and 4, the shaft 45 has an arm 47 secured to an end thereof and connected thru a cable 48 with the control arm 49 of a spill valve 50. The valve 50 communicates thru a pipe 51 (Fig. 2) with the interior of the cylinder 12 and, when opened, releases a charge of fluid from the cylinder 12 to a discharge pipe 52.

This mechanism therefore effects a lowering of the platform by releasing a charge of fluid from the hydraulic cylinder each time a panel P is fed to the platform under the roller 43. This roller 43 is mounted above the center of the platform and since the discharge conveyor 41 of the rip saw is above the top level of the platform even in its most elevated position, the plywood panels must move the roller 43 upward as they are deposited on the platform.

In order to assure an even alignment of the plywood panels P on the rollers of the platform, a series of bumpers 53, 54 and 55 are provided for engaging the ends of variable sized panels. The bumper 53 is mounted on a U-shaped band 56 that is swivelly carried between standards 57 that straddle the platform. Likewise, the bumper 54 is carried on a U-shaped band 58 behind the bumper 53 on a pair of standards 59 mounted ahead of the standards 57.

Similarly the bumper 55 is mounted on a U-shaped band 60 swivelly carried between standards 61. The bands 56, 58 and 60 are of diminishing width so that the same can nest.

Pulleys 62, 63 and 64 (Figure 1) are mounted above the bumpers 53, 54 and 55 for receiving cables 65, 66 and 67 respectively thereover. The ends of the cables 65 to 67 are secured to the tops of the bumpers 53 to 55 respectively while the other ends of the cables extend to the operator's station at the inlet end of the rip saw cutter (not shown). The cables permit the selective raising and lowering of the respective bumpers to accommodate short and long panels on the stacking device. As shown in Figure 1, the bumper 53 is down to abut the ends of long panels "P" while the bumpers 54 and 55 are in raised position to permit the passage of the long panels thereunder. If shorter panels are being fed to the stacking device the bumper 53 can be raised and either the bumpers 54 or 55 lowered to abut the panels.

When a stack of panels "P" has accumulated on the loading device and the platform is lowered, the rip saw operator raises the lowered bumper 53, 54 or 55 abutting the top panels "P" on the loading device and actuates a switch adjacent his station to start the electric motor 30 for driving the chains to move the push bar 28 toward the conveyor rolls 70 (Figure 1). The push bar 28 then moves the stack of panels P over the rollers 21 on the platform 17 and onto the rollers 70.

When the push bar 28 reaches the end of the platform 17 it strikes the limit switch 37a and is automatically moved back to the position shown in Figure 1 as will be hereinafter explained in detail.

The rip saw operator then opens a valve 71 adjacent his station at the inlet end of the rip saw to admit fluid through a pipe line 72 into the interior of the cylinder 12 for raising the hydraulic ram 14 to move the platform 17 into position for receiving another stack of panels from the rip saw conveyor 41. With the platform 17 in elevated position it is then lowered a step at a time by the valve control roll 43 as the panels "P" are deposited onto the platform.

Having described the apparatus, the control equipment for the driving motor 30 will now be explained:

Referring to Figure 5, the driving motor 30, which may be of any suitable type, is supplied with electric power through suitable control contactors.

For purposes of illustration, I have disclosed the motor as being of the three-phase alternating current type and the contactors as comprising a forward contactor 80 having an operating coil 81, and a reversing contactor 82 having an operating coil 83.

The forward contactor 80 is provided with normally open auxiliary control contacts 84 and normally closed auxiliary contacts 85.

The control of each cycle of operation of the motor is through a suitable push button 86 which may be placed in any position convenient to the rip saw operator.

The operation of the control equipment is as follows: With the cross bar 27 in the position shown in Figure 5, this bar actuating the normally closed limit switch 37 to open position, the cycle of operation is initiated by the operator closing the push button switch 86.

Closing of this push button energizes the operating coil 81 of the forward contactor through the following circuit: From the positive side of the control supply through push button 86, the operating coil 81 of the forward contactor, and to the other side of the control supply circuit.

Closing of the forward contactor, which will result from the energization of its operating coil, connects power to the motor in such a manner as to drive it in forward direction. As soon as the contactor 80 is closed, it is interlocked in closed position through the following circuit: From one side of the supply circuit through conductor 87, the contacts of normally closed limit switch 37a, conductor 88, through the contacts of switch 84, through coil 81, and thence to the other side of the control supply circuit.

Operation of the motor in a forward direction moves the pusher bar 28 until it reaches the limit switch 37a which is then opened. Opening of the limit switch 37a interrupts the interlocking circuit of the forward contactor and permits it to open.

When the forward contactor opens, the auxiliary switch 85 thereon closes its contacts and energizes the control coil 83 of the reversing contactor through the following circuit: From one side of the control supply circuit, through conductor 87, limit switch 37, conductor 89 to one side of coil 83, from the other side of coil 83 through conductor 90, the contacts of switch 85, and thence through conductor 91 to the other side of the control supply circuit. The reversing contactor 82 will now be energized and cause the motor to operate in reverse direction to carry the pushing bar back to its original position where it will open limit switch 37. Since the limit switch 37 is in the circuit of coil 83, opening of limit switch 37 will deenergize this coil and permit the reversing switch to open and deenergize the motor, which will then stop.

The apparatus has now completed one cycle, and the motor will not again be energized and started until the operator closes push button switch 86. Pressing of this switch will again cause the machine to operate through one complete cycle and stop.

From the above description it should be understood that the invention makes possible the automatic handling of plywood panels discharged from the saw without the aid of an operator other than the saw operator. The device of this invention neatly stacks plywood panels without damaging the same and then unloads the stack.

I am aware that many changes may be made and numerous details of construction may be varied through a wide range without departing from the principles of this invention, and I, therefore, do not propose limiting the patent granted hereon otherwise than necessitated by the prior art.

I claim as my invention:

1. In combination, a pair of conveyors in spaced longitudinal relation, a stacking elevator in the space between said conveyors, a plurality of pairs of standards at the sides of said elevator spaced along the length thereof, arms pivoted to the top portions of the standards, bumper boards carried by said arms and connecting the arms of each pair of standards and a separate cable for raising and lowering each bumper board about its pivot points on the standards whereby operation of a cable will lower a bumper board at a selected point along the length of the elevator to center material thereon in accordance with the length of the material.

2. In a stacker and unloader device including a vertically movable elevator, paired pivotably mounted arms on opposite sides of the elevator, a plurality of bumper boards suspended transversely over the elevator by said pivotable arms and spaced along the length thereof and means operated from a remote point for selectively lowering each bumper guard to aline the leading ends of material fed to the elevator in accordance with the length of the material.

3. A device for stacking rigid sheet material which comprises a conveyor unit, a vertically movable platform, a plurality of idle conveyor rollers rotatably mounted on said platform for receiving sheet material thereon, means attached to said platform for moving an accumulated stack of sheet material over said rollers and off of said platform, means for lowering said platform a step at a time controlled by the feeding of each unit of sheet material from said conveyor onto said platform, a plurality of paired pivotably mounted arms on opposite sides of said platform, a plurality of bumper boards suspended transversely over said platform by said pivotable arms and spaced along the length thereof and means operated from a remote point for selectively lowering each bumper board to align the leading ends of sheet material fed to said platform in accordance with the length of the sheet material.

ANDREW B. PETERSON.